US010262389B2

(12) United States Patent
Kruglick

(10) Patent No.: US 10,262,389 B2
(45) Date of Patent: Apr. 16, 2019

(54) INTERMEDIARY GRAPHICS RENDITION

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 171 days.

(21) Appl. No.: 15/483,740

(22) Filed: Apr. 10, 2017

(65) Prior Publication Data

US 2017/0209792 A1    Jul. 27, 2017

Related U.S. Application Data

(63) Continuation of application No. 14/360,288, filed as application No. PCT/US2013/066300 on Oct. 23, 2013, now Pat. No. 9,619,857.

(51) Int. Cl.
| | |
|---|---|
| *A63F 13/00* | (2014.01) |
| *G06T 1/20* | (2006.01) |
| *G06F 9/50* | (2006.01) |
| *G06T 15/00* | (2011.01) |
| *H04N 21/426* | (2011.01) |

(Continued)

(52) U.S. Cl.
CPC .............. *G06T 1/20* (2013.01); *A63F 13/355* (2014.09); *G06F 9/50* (2013.01); *G06T 15/005* (2013.01); *H04L 65/605* (2013.01); *H04L 67/2823* (2013.01); *H04L 67/38* (2013.01); *H04L 67/42* (2013.01); *H04N 21/42653* (2013.01); *H04L 65/80* (2013.01)

(58) Field of Classification Search
CPC ............................. G06F 9/50; H04N 21/42653
See application file for complete search history.

(56) References Cited

U.S. PATENT DOCUMENTS

| | | |
|---|---|---|
| 5,682,506 A | 10/1997 | Corby, Jr. et al. |
| 7,092,983 B1 | 8/2006 | Tyrrell, III |

(Continued)

FOREIGN PATENT DOCUMENTS

| | | |
|---|---|---|
| CN | 102196300 | 9/2011 |
| CN | 102959517 | 3/2013 |
| EP | 2451184 A1 | 5/2012 |

OTHER PUBLICATIONS

"About the OnLive Game Service," OnLive, accessed at https://web.archive.org/web/20130914012449/http://games.onlive.com/about, copyright 2013, accessed on Mar. 29, 2017, pp. 2.

(Continued)

*Primary Examiner* — Reginald Renwick

(57) ABSTRACT

Technologies related to intermediary graphics rendition are generally described. In some examples, an intermediary computing device may store graphics models in a model store. A server computing device may generate and send a compositing flow to the intermediary computing device. The compositing flow may comprise model identifiers and model rendering information. The intermediary computing device may retrieve models identified in the compositing flow from the model store, and provide the identified models and model rendering information to a Graphics Processing Unit (GPU) for rendering. The GPU may render graphics for delivery via a network to a client device.

18 Claims, 7 Drawing Sheets

(51) Int. Cl.
H04L 29/06 (2006.01)
H04L 29/08 (2006.01)
A63F 13/355 (2014.01)

(56) References Cited

U.S. PATENT DOCUMENTS

| | | | | |
|---|---|---|---|---|
| 7,430,593 | B2* | 9/2008 | Baldwin | H04L 67/1097 |
| | | | | 709/223 |
| 2003/0149762 | A1* | 8/2003 | Knight | H04L 29/06 |
| | | | | 709/224 |
| 2008/0204460 | A1 | 8/2008 | Marinkovic et al. | |
| 2009/0125961 | A1 | 5/2009 | Perlman et al. | |
| 2011/0304634 | A1 | 12/2011 | Urbach | |
| 2012/0165101 | A1 | 6/2012 | Krishnamoorthy et al. | |
| 2013/0050063 | A1 | 2/2013 | Poomachandran et al. | |
| 2013/0147818 | A1 | 6/2013 | Kuo et al. | |
| 2013/0212538 | A1 | 8/2013 | Lemire et al. | |
| 2013/0215110 | A1 | 8/2013 | Rivera et al. | |
| 2014/0207911 | A1 | 7/2014 | Kosmach et al. | |
| 2015/0154051 | A1 | 6/2015 | Kruglick | |

OTHER PUBLICATIONS

"Amazon Simple Storage Service (Amazon S3)," accessed at http://web.archive.org/web/20131022024349/http://aws.amazon.com/s3/, copyright 2013, accessed on Mar. 29, 2017, Pages.
"Content delivery network," Wikipedia, accessed at https://web.archive.org/web/20130827143622/https://en.wikipedia.org/wiki/Content_delivery_network, modified on Aug. 27, 2013, pp. 6.
"How many hours of HD-video can you get per each GB?," accessed at https://web.archive.org/web/20130626072538/http://www.tomshardware.co.uk/forum/299995-30-hours-video, Aug. 4, 2012, pp. 5.
"Level 3 Communications," Wikipedia, accessed at https://web.archive.org/web/20130814003806/http://en.wikipedia.org/wiki/Level_3_Communications, modified on Aug. 9, 2013, pp. 4.
"The Daedalus Gateway: The Psychology of MMORPGs" MMORPG Demographics, accessed at https://web.archive.org/web/20131007153648/http://www.nickyee.com/daedalus/gateway_demographics.html, copyright 1999-2004, accessed on Mar. 29, 2017, p. 1.
"AMD FirePro™ Professional Graphics Cards," accessed at http://www.amd.com/us/products/workstation/graphics/firepro-remotegraphics/r5000/Pages/r5000.aspx , accessed on Mar. 29, 2017, pp. 2.
"AMD Stream processors," accessed at http://www.newegg.com/Product/ProductList.aspx?Submit=ENE&DEPA=0&Order=BESTMATCH&N=-1&isNodeId=1&Description=AMD+Stream+processors&x=-975&y=-112, accessed on Mar. 29, 2017, pp. 5.
"Intel Quick Sync Video," Wikipedia, accessed at https://web.archive.org/web/20130824223940/http://en.wikipedia.org/wiki/Intel_Quick_Sync_Video, last modified on Jun. 12, 2013, pp. 2.
"Nvidia Geforce Grid Processors," accessed at https://web.archive.org/web/20130501091950/http://www.nvidia.com/object/grid-processors-cloud-games.html, archived on May 1, 2013, accessed on Mar. 29, 2017, pp. 3.
"Wireless Gigabit Alliance ," Wikipedia, accessed at http://web.archive.org/web/20131029224235/https://en.wikipedia.org/wiki/IEEE_802.11ad, last modified on Apr. 17, 2013, pp. 4.
Akamai, "Investor Summit: 2013" Slide presentation, 210 pages (Sep. 2013).
Alexander, K., "The Future of Cloud Gaming Is . . . Still Cloudy," accessed at https://web.archive.org/web/20131015214444/https://blogs.akamai.com/2012/08/the-future-of-cloud-gaming-isstill-cloudy.html, Aug. 24, 2012, pp. 2.
Brodkin, J., "Nvidia virtualizes the GPU for streamed desktops and cloud gaming," Ars Technica, accessed at https://web.archive.org/web/20130828083523/http://arstechnica.com/gaming/2012/05/nvidia-virtualizes-the-gpu-for-streamed-desktops-and-cloud-gaming/, May 16, 2012, pp. 3.

Bylund, A., "The Real Reason Nefflix Invests in Network Tech," accessed at https://web.archive.org/web/20130621212248/http://www.fool.com/investing/general/2013/01/09/the-real-reason-netflix-invests-in-network-tech.aspx, Jan. 9, 2013, p. 1.
Choy, S., et al., "The Brewing Storm in Cloud Gaming: A Measurement Study on Cloud to End-User Latency," Proceedings of the 11th Annual Workshop on Network and Systems Support for Games, Article No. 2, pp. 1-6, (Nov. 22-23, 2012).
Demerjian, C., "AMD announces SKY, the new cloud gaming line," accessed at https://web.archive.org/web/20130813222218/http://semiaccurate.com/2013/03/27/amd-announces-sky-the-new-cloud-gaming-line/, May 27, 2013, pp. 4.
Eisert, P., and Fechteler, P., "Remote Rendering of Computer Games," Proceedings of the Second International Conference on Signal Processing and Multimedia Applications (SIGMAP), pp. 1-6 (Jan. 2007).
Flora, D., "High Performance Cloud Streaming: A Game Changer," accessed at https://web.archive.org/web/20150124081540/http://www.cdn.net/blog/2013/05/high-performance-cloud-streaming-a-game-changer, May 20, 2013, pp. 5.
Fritz, B., "Netflix streams more than 1 billion hours in June," Los Angeles Times, accessed at https://web.archive.org/web/20130621213959/http://articles.latimes.com/2012/jul/03/entertainment/la-et-ct-netflix-billion-hours-20120703, Jul. 3, 2012, pp. 2.
Gallegos, A., "Gaikai Integrated with PlayStation 4," IGN, accessed at https://web.archive.org/web/20131004150139/http://www.ign.com/articles/2013/02/20/playstation-cloud-revealed, Feb. 20, 2013, pp. 4.
Grabham, D., "How Nvidia Grid is set to revolutionise cloud gaming," accessed at http://www.in.techradar.com/news/computing/servers/How-Nvidia-Grid-is-set-to-revolutionise-cloud-gaming/articleshow/38768898.cms, Jul. 24, 2013, pp. 25.
Groff, J., "An intro to modern OpenGL. Chapter 1: The Graphics Pipeline," Durian Software, accessed at https://web.archive.org/web/20130821235728/http://duriansoftware.com/joe/An-intro-to-modern-OpenGL.-Chapter-1:-The-Graphics-Pipeline.html, updated Apr. 5, 2010, pp. 7.
Guo, K., "A Novel Matching Algorithm to 3D Incomplete Object," Journal of Computational Information Systems, vol. 7, Issue 1, pp. 73-79 (Jan. 2011).
International Search Report and Written Opinion for International Application No. PCT/US2013/066300 dated Apr. 16, 2014, pp. 15.
International Search Report and Written Opinion for International Application No. PCT/US2014/015776 dated Jul. 8, 2014, pp. 8.
Islam, Z., "Nvidia Reveals More About Cloud Gaming Service: Grid," Tom's Hardware, accessed at http://www.tomshardware.com/news/Nvidia-Grid-Cioud-Gaming-Service,20256.html, Jan. 8, 2013, pp. 4.
Johnson, E., "Mobile Gamers With Better Phone Screens Spend More on In-App Purchases," All Things Digital, accessed at https://web.archive.org/web/20130913062107/http://allthingsd.com/20130321/mobile-gamers-with-better-phone-screens-spend-more-on-in-app-purchases/, Mar. 21, 2013, pp. 2.
Lawler, R., "Netflix Rolls Out Its Own CDN: Open Connect," TechCrunch, accessed at https://web.archive.org/web/20130905013131/http://techcrunch.com/2012/06/04/netflix-open-connect, Jun. 4, 2012, pp. 2.
Molnar, S., et al., "A Sorting Classification of Parallel Rendering," IEEE Computer Graphics and Applications, vol. 14, Issue 4, pp. 22-32 (Jul. 1994).
Negishi, M., "How Nintendo Got Upended by 'Puzzle & Dragons'," The Wall Street Journal, accessed at https://www.wsj.com/articles/SB10001424127887324904004578535511438819762, updated on Jun. 11, 2013, pp. 2.
Pathan A-M.K.,and Buyya, R., "A Taxonomy and Survey of Content Delivery Networks," Grid Computing and Distributed Systems Laboratory, pp. 1-44, (Feb. 28, 2007).
Petitte, O., "Diablo III sales and World of Warcrafl subscriber count revealed in Activision earnings report," accessed at http://www.pcgamer.com/diablo-iii-world-of-warcraft-activision/, Feb. 8, 2013, pp. 5.
Rao, L., "Cloud-Based Game Streaming Service Gaikai Raises $30M From Qualcomm, NEA and Others," accessed at https://web.

(56) References Cited

OTHER PUBLICATIONS archive.org/web/20130902222628/http://techcrunch.com/2011/07/20/cloud-based-game-streaming-service-gaikai-raises-30m-from-qualcomm-nea-and-others/, Jul. 20, 2011, p. 1.

Samanta, R., et al., "Parallel Rendering with K-Way Replication" Proceedings of the IEEE 2001 symposium on parallel and large-data visualization and graphics, pp. 75-84 (Oct. 22-23, 2001).

Shimpi, A.L., "Intel Iris Pro 5200 Graphics Review: Core i7-4950HQ Tested," accessed on https://web.archive.org/web/20131014191535/http://www.anandtech.com/show/6993/intel-iris-pro-5200-graphics-review-core-i74950hq-tested/, Jun. 1, 2013, pp. 4.

Simpson, C., "Samsung's Galaxy S4 has a next-gen video codec," accessed at https://web.archive.org/web/20130927103059/http://www.pcworld.idg.com.au/article/456443/samsung_galaxy_s4_has_next-gen_video_codec/, Mar. 15, 2013, pp. 5.

Takahashi, D., "Nvidia poised to change gaming with cloud graphics chips," accessed at https://web.archive.org/web/20130906084538/http://venturebeat.com/2012/05/15/nvidia-tailors-its-graphics-chip-for-cloud-based-gaming/, May 15, 2012, pp. 14.

Tassi, P., "Google and Apple May Bring Us a Console War We Didn't See Coming," https://web.archive.org/web/20131020091211/http://www.forbes.com/sites/insertcoin/2013/06/28/google-and-apple-may-bring-us-a-console-war-we-didnt-see-coming/, Jun. 28, 2013, pp. 41.

Terashima, N., et al., "Experiment of Virtual Space Distance Education System Using the Objects of Cultural Heritage," IEEE International Conference on Multimedia Computing and Systems, vol. 2, pp. 153-157 (Jun. 7, 1999).

Turner, R., "Nvidia enables GPU virtualization and talks up cloud for gaming and VDI," accessed at http://ovum.com/2012/05/28/nvidia-enables-gpu-virtualization-and-talks-up-cloud-for-gaming-and-vdi/, May 28, 2012, pp. 10.

Wang, J., "Nvidia GeForce GRID—A Glimpse at the Future of Gaming," accessed at https://web.archive.org/web/20130812122610/http://www.geforce.com/whats-new/articles/geforce-grid, May 15, 2012, pp. 7.

Yahyavi, A., and Kemme, B., "Peer-to-Peer Architectures for Massively Multiplayer Online Games:A Survey," ACM Computing Surveys, vol. 46, No. 1, Article No. 9, pp. 1-51 (Oct. 2013).

* cited by examiner

MODEL 701  MODEL 702  MODEL 703

FRAME 1:
MODEL 701; POSITION X1, Y1; ORIENTATION O1;
MODEL 703; POSITION X2, Y2; ORIENTATION O2;
FRAME 2:
MODEL 701; POSITION X3, Y3; ORIENTATION O3;
MODEL 703; POSITION X4, Y4; ORIENTATION O4;
MODEL 702; POSITION X5, Y5; ORIENTATION O5;
...

COMPOSITING FLOW 710

RENDERED GRAPHICS STREAM 720

FRAME 1

FRAME 2

INTERMEDIARY GRAPHICS RENDITION

CROSS-REFERENCE TO RELATED APPLICATIONS

This application is a Continuation under 35 U.S.C. § 120 of U.S. application Ser. No. 14/360,288 filed on May 22, 2014, which is the U.S. National Stage filing under 35 U.S.C. § 371 of International Application No. PCT/US13/066300 filed on Oct. 23, 2013. International Application No. PCT/US13/066300 and U.S. application Ser. No. 14/360,288 are herein incorporated by reference in their entirety.

BACKGROUND

Unless otherwise indicated herein, the materials described in this section are not prior art to the claims in this application and are not admitted to be prior art by inclusion in this section.

Graphics rendering typically involves generating images and/or video. For example, video games generally involve real-time graphics rendering to generate video as a video game is played. The generated video may reflect, for example, video game objects and scenery as a player interacts with a video game environment, as well as player actions, actions of multiple other players in a multi-player game, and/or other actions or events that may occur in the video game environment. Real-time graphics rendering may also be performed in a wide variety of other, non-video game applications.

A large amount of the video currently streamed over the Internet is not rendered in real-time, or may have been recorded without any graphics rendering at all. For example, many videos available from websites such as YOUTUBE®, news websites, social network websites, and a great many other websites, as well as movies and television shows available from services such as NETFLIX®, include pre-recorded or otherwise previously rendered videos that may be streamed without real-time graphics rendering operations. Such videos may be streamed to client devices directly from datacenters that host the websites or services themselves, such as the datacenters hosting the YOUTUBE® website or the NETFLIX® service, or such videos may be streamed to client devices from any of multiple distributed Content Delivery Network (CDN) servers deployed in multiple data centers across the Internet. By storing video files at distributed CDN servers, network loads and costs associated with data delivery can be reduced.

Meanwhile, video content that is rendered in real-time or near real-time prior to streaming is currently limited to streaming from datacenters hosting the website or service that interacts with the client. For example, a multiplayer video game application may render graphics at a central datacenter, and may stream real-time rendered video content from the central datacenter hosting the video game application to the various client devices operated by players of the video game. Applications that conduct real-time graphics rendering for multiplayer games are currently unable to leverage CDN servers for delivery of real-time rendered video. One result is that real-time rendered video content may on average travel longer network distances than pre-recorded video content; real-time rendered video content may on average travel across more expensive network infrastructure than pre-recorded video content; and real-time rendered video content may on average travel across network infrastructure that is burdened with higher loads than the network infrastructure carrying pre-recorded video content.

SUMMARY

The present disclosure generally describes technologies including devices, methods, and computer readable media relating to intermediary graphics rendition. Some example methods may comprise rendering graphics by an intermediary computing device. Example methods may include storing one or more graphics models in a model store; receiving, via a network, session information from a server computing device, the session information identifying a client device; receiving, via the network, a compositing flow provided by the server, wherein the compositing flow may comprise, e.g., model identifiers and model rendering information, wherein the model rendering information comprises at least model position information; retrieving models identified in the compositing flow from the model store; and providing the identified models from the model store and the model rendering information to a Graphics Processing Unit (GPU) for rendering, thereby causing the GPU to render graphics for delivery via the network to the client device. The rendered graphics for delivery to the client device may comprise the identified models from the model store positioned according to the model rendering information in the compositing flow.

Some example methods may comprise providing a compositing flow to an intermediary computing device by a server computing device, wherein the intermediary computing device is adapted to provide rendered graphics according to the compositing flow. Example methods may include receiving, via a network, application control instructions from a client device; sending to the intermediary computing device, via the network, session information identifying the client device; generating the compositing flow, wherein the compositing flow may comprise model identifiers and model rendering information as a real-time graphics application output resulting from processing, by the real-time graphics application, an input comprising application control instructions from the client device, wherein the compositing flow optionally does not include one or more models identified by the model identifiers, and wherein the model rendering information comprises at least model position information; and sending, via the network, the compositing flow to the intermediary computing device. Example methods may furthermore include sending models to the intermediary computing device using any of several model delivery approaches described herein.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include an intermediary computing device comprising a processor, a memory, and a graphics rendering intermediary configured to carry out the intermediary methods described herein, or a server computing device comprising a processor, a memory, and a real-time graphics application configured to carry out the server methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
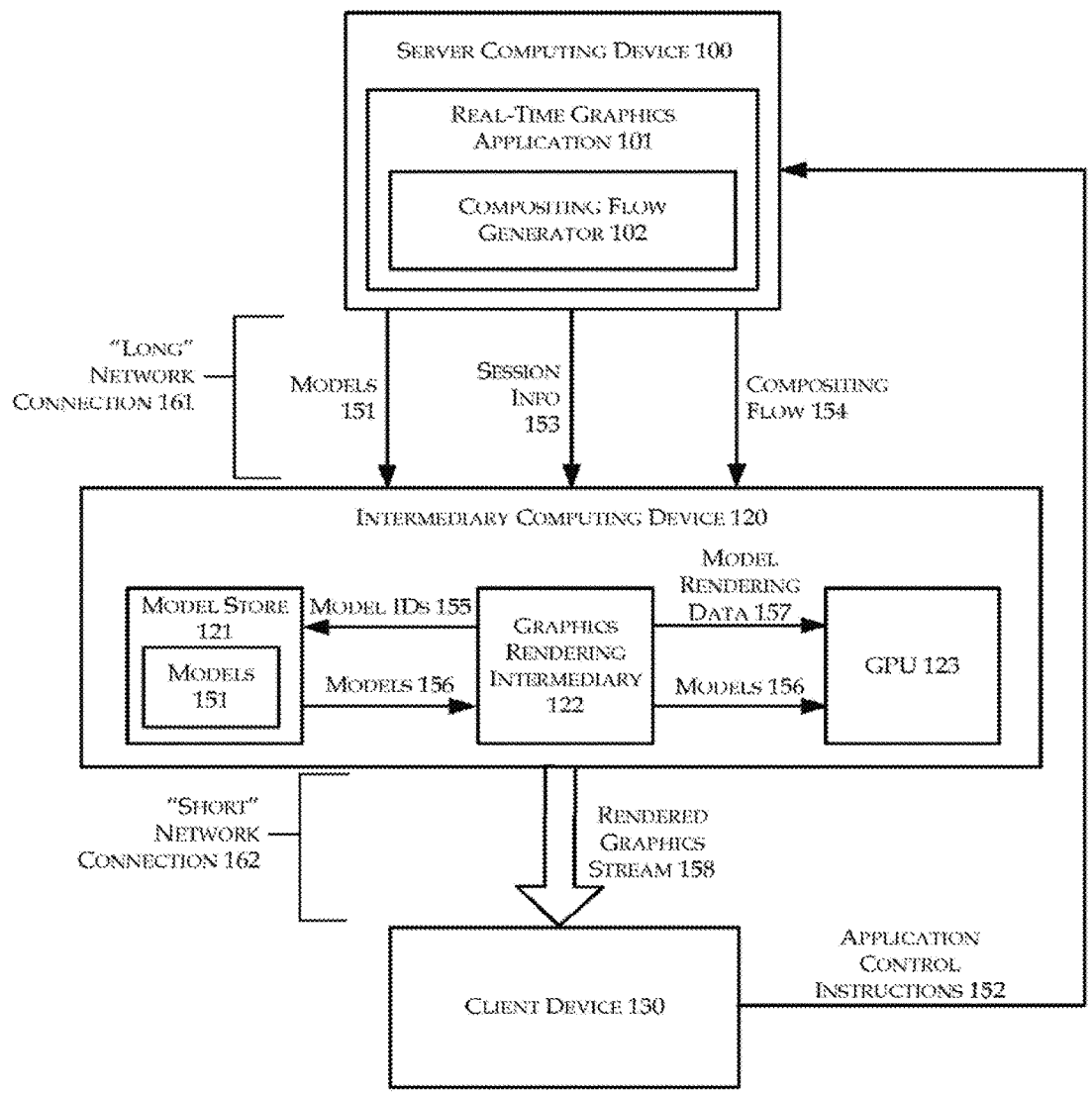
FIG. 1 is a diagram illustrating example server, intermediary, and client devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to rendering graphics using an intermediary. In some examples, an intermediary computing device may store graphics models in a model store. A server computing device may generate and send a compositing flow to the intermediary computing device. The compositing flow may comprise model identifiers and model rendering information. The intermediary computing device may retrieve models identified in the compositing flow from the model store, and provide the identified models and model rendering information to a GPU for rendering. The GPU may render graphics for delivery via a network to a client device.

A video game application is used herein as an example real-time graphics application which may be equipped for intermediary graphics rendition according to this disclosure. For example, servers at a data center may host a multiplayer online video game. The video game may use video game models such as video game objects, video game characters, and video game scenery elements. Example video game objects include books, vehicles, treasure chests, clothing, weapons, etc. Example video game characters include characters representing one or more players of the video game, monsters, opponents, assistants, etc. Example video game scenery elements include rocks, trees, buildings, etc. In a multiplayer online video game, model identifiers and model rendering information in compositing flows may be influenced by the actions of the multiple players of video game. Persons of skill in the art will appreciate that the technologies described herein may be applied in applications other than video games, namely, in any applications that deliver real-time rendered graphics to one or more client devices.

In an example use of the intermediary graphics rendition technologies described herein, a user desiring to play a video game may use a client device, such as a Personal Computer (PC), mobile phone, tablet, video gaming console, television, or other computing device, to connect, via a network such as the Internet, to a video game application hosted at one or more servers in a data center. The video game application and the client device may initially exchange network address, identity and/or credential information to establish a communication session.

Once the client device is connected to the video game application, the user may control an input device such as a keyboard, mouse, joystick, touch screen, or other device to interact with the video game application. User inputs to interact with an application are referred to herein as application control instructions. The client device may transmit received application control instructions across the network, to the video game application. The video game application may receive and process the application control instructions.

The video game application hosted at the data center may be adapted to process application control instruction inputs received from the client device, and to generate compositing flow outputs. The compositing flow may comprise model identifiers and model rendering information. The video game application may send the compositing flow to an intermediary computing device, to thereby employ the intermediary computing device to render video game graphics responsive to the application control instructions, and to deliver rendered graphics to the client device. The client device may receive and display the rendered graphics. The user may continue to interact with the video game, generating additional application control instructions which may be similarly sent from the client device to the video game application at the datacenter. The video game application may continue to receive and process application control instructions; and the video game application may continue to provide a compositing flow to the intermediary computing device, to employ the intermediary computing device to render video game graphics and deliver rendered graphics to the client device.

FIG. 1 is a diagram illustrating example server, intermediary, and client devices, arranged in accordance with at least some embodiments of the present disclosure. As depicted, FIG. 1 includes a server computing device 100, an intermediary computing device 120, and a client device 130.

Server computing device 100 comprises a real-time graphics application 101, and real-time graphics application 101 comprises a compositing flow generator 102. Intermediary computing device 120 comprises a model store 121, a graphics rendering intermediary 122, and a GPU 123.

Server computing device 100, intermediary computing device 120, and client device 130 may be coupled via a network comprising wired and/or wireless network connections, such as the Internet. In some embodiments, server computing device 100 may be coupled with intermediary computing device 120 via a "long" network connection 161, and intermediary computing device 120 may be coupled with client device 130 via a "short" network connection 162. "Long" and "short" network connections 161 and 162 may comprise portions of a larger network, such as the Internet, wherein the "long" network connection 161 may be longer than "short" network connection 162 in the sense of having longer network packet travel times between endpoints and/ or having higher transmission costs, which may, but need not result from longer physical distance.

In some embodiments, "Long" network connection 161 may for example include Tier 1 networks, which may be run at high load factors and may be paid (by money or peering credits) based on Terabytes (TB) delivered. "Long" network connection 161 may also include more network hops and/or portions of the larger network subject to higher loads than "short" network connection 162. For example, when server computing device 100 is a server in any given datacenter, and a CDN, Metro Area Network (MAN), or other network includes servers that may be adapted to serve as intermediary computing devices, then intermediary computing device 120 may comprise a CDN or MAN server that may be selected to render graphics for client device 130. Server computing device 100 may select intermediary computing device 120, at least in part, for its relatively short network connection to client device 130. Meanwhile, server computing device 100 may be coupled with client device 130 via any combination of network connections 161 and 162, portions thereof, and/or via additional network segments not shown in FIG. 1.

In some embodiments, real-time graphics application 101 may be adapted to send models 151 to intermediary computing device 120 via "long" network connection 161. Real-time graphics application 101 may be adapted to optionally also send models 151 to any other intermediary computing devices which real-time graphics application 101 may employ for graphics rendering and delivery. Each of the models 151 sent to intermediary computing device 120 may be identified by a model identifier (ID), e.g., by a model ID comprising a unique string of letters, numbers, and/or symbols which may be used to uniquely identify each model. Intermediary computing device 120 may be adapted to receive models 151 and to store models 151 identified by model IDs in model store 121.

Models 151 may comprise digital data representing graphical elements employed by real-time graphics application 101. For example, in the context of a video game application, models 151 may comprise three dimensional (3D) digital models of objects, characters, and/or scenery elements encountered by players of the video game. In some embodiments, models 151 may include, or may be associated with, audio as well as visual properties, and/or other properties such as tactile feedback properties, e.g., for controller vibrations or other tactile feedback which may be applied at client device 130 in connection with player encounters with a model.

Real-time graphics application 101 may be adapted to establish a communication session with client device 130, e.g., in response to a connection request from client device 130. During the communication session, client device 130 may transmit application control instructions 152 across a network, such as the Internet, to real-time graphics application 101. In some embodiments, real-time graphics application 101 may also establish communication sessions multiple other client devices, and may receive application control instructions from the multiple other client devices, e.g., client devices operated by the multiple players of a multiplayer online video game.

Real-time graphics application 101 may be adapted to receive and process application control instructions 152, optionally along with application control instructions received from multiple other client devices. Processing application control instructions 152 may comprise, inter alia, using compositing flow generator 102 to generate compositing flow 154. Real-time graphics application 101 may be adapted to send compositing flow 154 to intermediary computing device 120 for graphics rendering and delivery of rendered graphics stream 158 to client device 130. In some embodiments, real-time graphics application 101 may optionally be configured to send compositing flow 154 to multiple different intermediary computing devices for graphics rendering and delivery of identical rendered graphics streams to each of multiple client devices. In some embodiments, real-time graphics application 101 may optionally be configured to generate different compositing flows for each of multiple client devices, and to deliver the different compositing flows to multiple different intermediary computing devices. The multiple different intermediary computing devices may in turn render and deliver different rendered graphics streams for each of the multiple client devices. Compositing flow 154 may comprise model IDs and model rendering data as a real-time graphics application 101 output resulting from processing, by real-time graphics application 101, an input comprising application control instructions 152. Compositing flow 154 may optionally not include some or all models identified by model IDs included in compositing flow 154.

Compositing flow generator 102 may be arranged to generate compositing flow 154 as a substitute for, or as a lightweight version of, a rendered graphics stream. Real-time graphics application 101 may or may not generate a rendered graphics stream locally at server computing device 100 in addition to generating compositing flow 154 for delivery to intermediary computing device 120.

In embodiments adapted to render graphics via a local GPU at server computing device 100, real-time graphics application 101 may be adapted to send to the local GPU shape primitives represented using vertexes in 3D space and properties such as colors and textures at those vertexes. The shape primitives may be sent to the local GPU without compositing information such as model position information, model orientation information, viewpoint information, or light source information. Instead, the vertex locations may be in an object coordinate system that represents a model. Real-time graphics application 101 may apply a compositing operation in which instructions are sent to the local GPU for, inter alia, the position, orientation, viewpoint and/or light source of each model. Compositing instructions may be used, e.g., to position, orient, translate, and rotate each object coordinate system, and/or apply lighting/shading to the models. A view of the various models composed according to the compositing operation may comprise a rendered 2D view of a 3D scene.

Compositing complexities may arise from the fact that models may be very large and rendering a typical scene may include providing models and information multiple times per frame, which is one reason why graphics cards generally use high bandwidth Peripheral Component Interconnect (PCI) communications. Scene compositing techniques may come in three varieties: sort-first, sort middle, and sort-last. In embodiments adapted to provide multiple views of unfolding scenes, e.g., in the case of multiplayer video games wherein each player may view a scene from a different viewpoint, real-time graphics application 101 may compose each scene by loading appropriate models and positioning the models, and orienting the models, lighting the models, etc. Real-time graphics application 101 may then render multiple different views of each scene, e.g., views from the viewpoints of the multiple players. It will be appreciated with the benefit of this disclosure that such approaches may also be used by some embodiments to generate multiple compositing flows for delivery to multiple intermediary computing devices.

In some embodiments, real-time graphics application 101 may adapted to generate compositing flow 154 as a substitute for, or in addition to, rendering graphics via a local GPU as described above. It may be observed that if real-time graphics application 101 interactions with a local GPU at server computing device 100 did not require model delivery, compositing operations may be limited to providing instructions comprising model IDs and rendering information such as model orientations and placement, viewpoints, and light source information. In some cases, certain rendering information may also be limited, e.g., by omitting light source, positioning, orientation, or other rendering information when such rendering information remains unchanged from scene to scene. A hypothetical very large memory GPU with models preloaded, may use, e.g., a few kilobytes (KB) per second of compositing updates instead of, e.g., the 8 Gigabytes (GB) per second of 32 lane PCI-express that is currently used for graphics rendering including model delivery.

In some embodiments, compositing flow generator 102 may be arranged to generate compositing flow 154 by either calculating or extracting compositing operation instructions substantially similar to the compositing operation instructions that may be sent to the local GPU at server computing device 100. Compositing flow generator 102 may be adapted to include the compositing operation instructions in compositing flow 154. In some embodiments, compositing flow generator 102 may be adapted to modify compositing operation instructions, e.g., by inserting or modifying model ID numbers. Real-time graphics application 101 may or may not also generate a rendered graphics stream locally at server computing device 100 as a byproduct of generating compositing flow 154, or for other reasons.

Intermediary computing devices such as CDN servers may comprise large memory model stores such as model store 121, and intermediary computing device 120 may leverage model store 121 to effectively implement, at intermediary computing device 120, the hypothetical very large memory graphics card described above for use by real-time graphics application 101, at least partially allowing the corresponding reduction in network traffic by separating delivery of models 151 from delivery of compositing flow 154.

Real-time graphics application 101 may be adapted to employ intermediary computing device 120 to render graphics and deliver rendered graphics to client device 130 by sending, via "long" network connection 161, session information 153 and compositing flow 154 to intermediary computing device 120. Real-time graphics application 101 may optionally send compositing flow 154 to intermediary computing device 120 using high priority channels. Real-time graphics application 101 may be adapted to employ intermediary computing device 120 and/or other intermediary computing devices to render graphics and deliver rendered graphics to multiple other client devices.

Intermediary computing device 120 may be adapted with graphics rendering intermediary 122, wherein graphics rendering intermediary 122 may be adapted to manage receiving models 151 at intermediary computing device 120, storing models 151 in model store 121, receiving session information 153 and compositing flow 154 from server computing device 100, graphics rendering by GPU 123, and delivery of rendered graphics stream 158 to client device 130, on behalf of real-time graphics application 101. In some embodiments, intermediary computing device 120 may also be adapted to render graphics and supply rendered graphics streams to multiple other client devices, e.g., by loading multiple instances of graphics rendering intermediary 122 to serve the multiple client devices. Intermediary computing device 120 may thereby be adapted to simultaneously generate multiple different rendered graphics streams from multiple different received compositing flows. Intermediary computing device 120 may simultaneously supply each of the different rendered graphics streams to a different client device, where the client devices may be identified in received session information applicable to each received compositing flow.

Graphics rendering intermediary 122 may be adapted to receive and store models 151 according to one or more different model delivery embodiments. The one or more different model delivery embodiments may also be implemented at server computing device 100. In some model delivery embodiments, real-time graphics application 101 may be adapted to send models 151 to intermediary computing device 120 prior to communication sessions with client devices. Graphics rendering intermediary 122 may be correspondingly adapted to receive and store models 151 for use in graphics rendering operations in connection with future potential communication sessions with client devices.

In some model delivery embodiments, real-time graphics application 101 may be adapted to send models 151 to intermediary computing device 120 during a communication session with client device 130. Graphics rendering intermediary 122 may correspondingly be adapted to receive and store models 151 for use in graphics rendering operations in connection with the ongoing communication session with client device 130. Graphics rendering intermediary 122 may also optionally be adapted to store models 151 for use in graphics rendering operations in connection with future potential communication sessions with client devices.

In some model delivery embodiments, real-time graphics application 101 may be adapted to send models 151 to intermediary computing device 120 in hybrid fashion, e.g., by sending some of models 151 prior to communication sessions with client devices, and sending some of models 151 during the communication session with client device 130. Graphics rendering intermediary 122 may correspondingly be adapted to receive and store both the initially and subsequently received models 151 for use in graphics rendering operations. Graphics rendering intermediary 122 may use the initially and subsequently received models 151 in connection with the ongoing communication session with client device 130. Graphics rendering intermediary 122 may store the initially and subsequently received models 151 for use in graphics rendering operations in connection with future potential communication sessions with client devices.

In response to receiving session information 153 from server computing device 100, graphics rendering intermediary 122 may be adapted to establish a communication session with client device 130. In some embodiments, session information 153 may identify client device 130 to intermediary computing device 120. In some embodiments, session information 153 may include additional session information, such as a session ID for the communication session between real-time graphics application 101 and client device 130, to allow intermediary computing device 120 to send rendered graphics to client device 130 in a manner that integrates with the session between client device 130 and real-time graphics application 101. In the communication session with client device 130, intermediary computing device 120 may send rendered graphics stream 158 to client device 130, for display at client device 130 in connection with the session between server computing device 100 and client device 130.

In an example operation according to FIG. 1, compositing flow 154 may comprise model IDs 155, which may identify models 156 within a larger set of models 151 in model store 121. Compositing flow 154 may also comprise model rendering data 157 for models 156. Model rendering data 157 may include, e.g., model position information, model orientation information, viewpoint information, light source information, and/or any other information specifying how models 156 are to be rendered, e.g., by positioning models 156, orienting models 156, viewing models 156 from one or more viewpoints, and/or lighting (and shading) models 156 according to light source information. Model rendering data 157 may optionally be accompanied by audio, tactile, or other data specifying additional outputs for playback in connection with displaying a rendered model.

In response to receiving compositing flow 154, graphics rendering intermediary 122 may be adapted to retrieve models 156 identified in compositing flow 154. For example, graphics rendering intermediary 122 may query model store 121 with model IDs 155, and model store 121 may return corresponding models 156. Graphics rendering intermediary 122 may be adapted to optionally combine or sequence models 156 and rendering data 157 for GPU 123. Graphics rendering intermediary 122 may be adapted to provide models 156 and rendering data 157, optionally as a combined or sequenced stream, to GPU 123 for rendering, thereby causing GPU 123 to render graphics for delivery to client device 130. Models 156 and rendering data 157 may be combined or sequenced according to, e.g., any industry standard graphics format, such as for example graphics formats used by the various Open Graphics Library (OpenGL) standards.

In some embodiments, a same GPU, such as GPU 123, may be used to simultaneously provide rendered graphics to multiple clients according to multiple different compositing flows. For example, GPU 123 may comprise a virtualized or shared GPU, for example using VGX virtualization technologies made by NVIDIA®. Such arrangements allow real-time graphics application 101 and/or multiple different real-time graphics applications served by different model stores at intermediary computing device 120, to effect delivery of multiple different rendered graphics streams to different client devices while sharing GPU 123 at intermediary computing device 120 as appropriate to the particular demands of each rendered graphics stream.

In some embodiments, GPU 123 may comprise a datacenter targeted GPU graphics card. Current graphics cards include, for example, NVIDIA KEPLER® and AMD SKY® series graphics cards. The AMD SKY 900 currently has 3,584 stream processors. Thus if 480 stream processors are used for generating HD rendered video graphics streams for each client device, an average of 30 end users/client devices could be served by a single intermediary computing device 120 comprising three AMD SKY 900 cards. Applying a roughly estimated gain of 2× for virtualization load optimization would serve 60 end users/client devices, again for a single intermediary computing device 120. A datacenter comprising intermediary computing device 120 may of course include additional intermediary computing devices as necessary to meet demand.

Rendered graphics stream 158 may comprise rendered video graphics from GPU 123, including renderings of models 156 from the model store 121 as identified by model IDs 155 in compositing flow 154, the models 156 positioned and otherwise rendered according to model position information and/or other data in model rendering data 157 from compositing flow 154. Graphics rendering intermediary 122 may be adapted to deliver rendered graphics stream 158 to client device 130, or to otherwise cause rendered graphics stream 158 to be delivered from GPU 123 to client device 130, via "short" network connection 162.

In some embodiments, graphics rendering intermediary 122 may operate continuously or substantially continuously as an ongoing compositing flow 154 is received. In other words, compositing flow 154 may comprise a continuous or substantially continuous flow of different model IDs and model rendering data, which may continue throughout a communication session between server computing device 100 and client device 130. Graphics rendering intermediary 122 may continuously or substantially continuously receive the different model IDs and model rendering data, retrieve identified models from model store 121, supply models and model rendering data to GPU 123, and deliver rendered graphics stream 158 to client device 130 as identified in session information 153. When the session between server computing device 100 and client device 130 is terminated, server computing device 100 may optionally send a termination notification (not shown in FIG. 1) to intermediary computing device 120, or server computing device 100 may discontinue compositing flow 154, and intermediary computing device 120 may discontinue graphics rendering on behalf of server computing device 100 in response to the termination notification or discontinuation of compositing flow 154.

It will be appreciated that while in some embodiments, intermediary computing device 120 may receive models 151 from server computing device 100 via "long" network connection 161, other embodiments may comprise sending models 151 to intermediary computing device 120 by a model delivery server other than server computing device 100. Furthermore, models 151 may be provided to intermediary computing device 120 by shipping a Digital Versatile Disk (DVD) or other storage medium to operators of intermediary computing device 120, who may then transfer models 151 from such storage media to model store 121.

In model delivery embodiments wherein real-time graphics application 101 is adapted to send models 151 to intermediary computing device 120 prior to communication sessions with client devices, and graphics rendering intermediary 122 is adapted to receive and store models 151 for use in graphics rendering operations in connection with future potential communication sessions with client devices, real-time graphics application 101 may send models 151 in any number of model packages and/or model updates. The model packages and model updates may identify real-time graphics application 101 so that intermediary computing device 120 may store received models in an appropriate model store 121. In some embodiments, intermediary computing device 120 may include, or intermediary computing device 120 may have access to, multiple model stores for use in connection with multiple different real-time graphics applications.

In model delivery embodiments wherein real-time graphics application 101 is adapted to send models 151 to intermediary computing device 120 during a communication session with client device 130, and graphics rendering intermediary 122 is adapted to receive and store models 151 for use in graphics rendering operations in connection with the ongoing communication session with client device 130, real-time graphics application 101 may include models 151 in compositing flow 154. For example, real-time graphics application 101 may initially include, in compositing flow 154, models referenced by model IDs such as model IDs 155 which are referenced in compositing flow 154. As compositing flow 154 continues, some of the referenced models may be new, i.e., may have not been previously included in compositing flow 154, while other referenced models may have been previously included in compositing flow 154. Real-time graphics application 101 may be adapted to determine which models identified by the model IDs in compositing flow 154 were previously sent to the intermediary computing device 120. Real-time graphics application 101 may include models not previously sent to intermediary computing device 120 in compositing flow 154, while not including models previously sent to intermediary computing device 120 in compositing flow 154. Thus for example, in some scenarios, as compositing flow 154 continues, real-time graphics application 101 may include fewer models in compositing flow 154.

Meanwhile, in response to receiving models in compositing flow 154, e.g., models not previously stored in model store 121, intermediary computing device 120 may be adapted to extract the models from compositing flow 154 and store the extracted models in model store 121. Storing extracted models in model store 121 may be done simultaneously with providing models in compositing flow 154 along with model rendering data to GPU 123 for graphics rendering and delivery of rendered graphics stream 158 to client device 130.

Example real-time graphics applications may include, e.g., applications such as those accessible via the GAIKAI®, ONLIVE®, and cloud gaming networks, which may be modified to incorporate the technologies described herein. An advantage of real-time graphics applications in general includes the ability to deliver rendered graphics streams to different client devices in which memory and processing capabilities may be variable. Highly capable desktop computers or gaming consoles with onboard GPUs may be able to render graphics locally, however, lower capability tablets, televisions, or smart phones may not have sufficient onboard graphics processing to render graphics locally. To serve all client devices, regardless of device capabilities, it may be advantageous to deliver full-fledged video via the network, rather than rely on local client device capabilities. However, this disclosure appreciates that delivering full-fledged video over "long" network connection 161 is more costly and lower performance than delivering full-fledged video over "short" network connection 162.

This disclosure therefore provides, inter alia, an approach for delivering relatively lightweight compositing flows over "long" network connection 161, while delivering full-fledged video over "short" network connection 162. Benefits of such an approach include removal of large bandwidth video traffic from long haul layers of the network, reducing the network costs for delivering video to client devices. As a result, users at client devices may experience more responsive real-time graphics applications, while continuing to receive high quality video. Because delivered video graphics may not be subject to long haul congestion, delivered video graphics may also be of higher quality and stability. Real-time graphics applications providers, meanwhile, may pay less to provide such streamed video. Intermediary computing device operators may have a meaningful service to offer to real-time graphics applications, driving some payments into CDNs or other operators of intermediary computing devices, and in turn the cable and other last mile operators who work with CDNs. Furthermore, hardware costs associated with GPUs may also be reduced by sharing GPU resources of intermediary computing devices across multiple real-time graphics applications.

Figure 2:
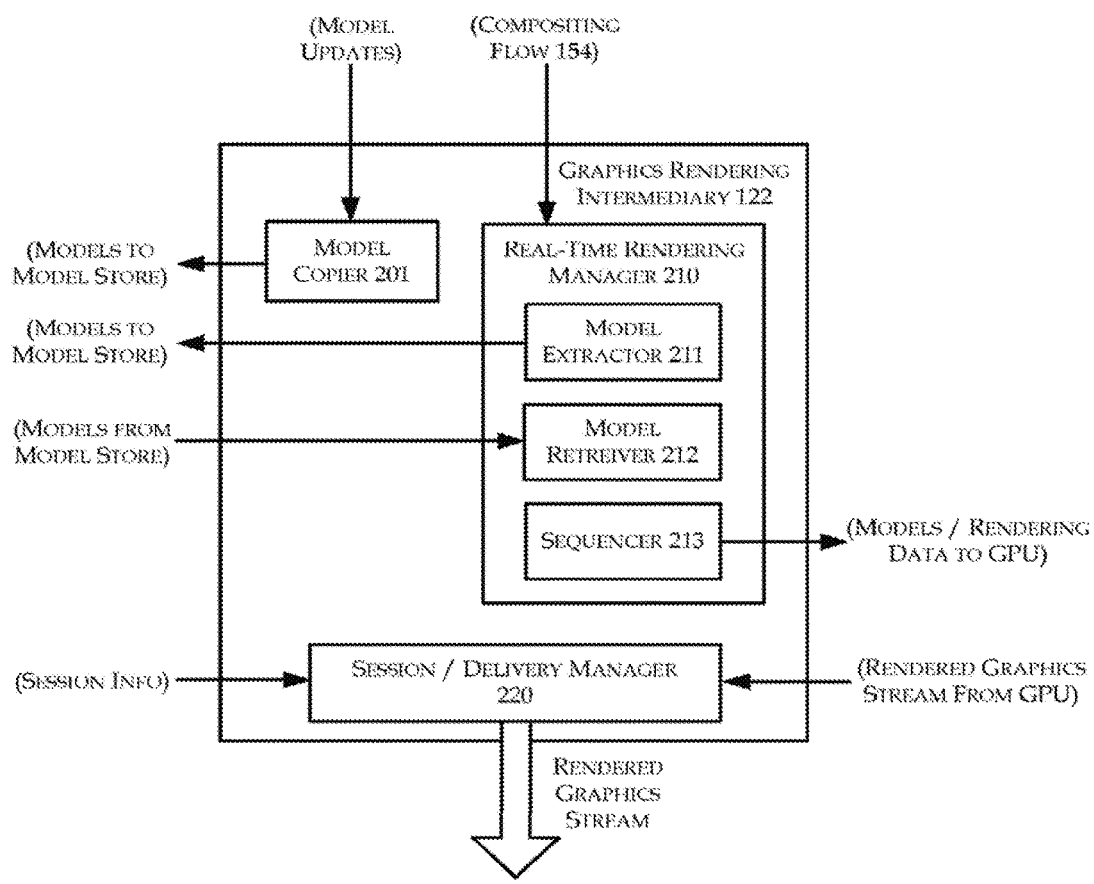
FIG. 2 is a diagram illustrating an example graphics rendering intermediary as may be configured at an intermediary computing device.

FIG. 2 is a diagram illustrating an example graphics rendering intermediary as may be configured at an intermediary computing device, arranged in accordance with at least some embodiments of the present disclosure. Example graphics rendering intermediary 122 comprises a model copier 201, a real-time rendering manager 210, and a session/delivery manager 220. Real-time rendering manager 210 comprises a model extractor 211, a model retriever 212, and a sequencer 213.

In FIG. 2, graphics rendering intermediary 122 may be adapted to receive models in multiple different model delivery modes. Model copier 201 may be adapted to receive and store model updates in a model store, for use in graphics rendering operations in connection with future potential communication sessions with client devices. Model extractor 211 may be adapted to extract models from compositing flow 154, and to store extracted models in the model store for use in an ongoing communication session with a client device, as well as optionally for use in graphics rendering operations in connection with future potential communication sessions with client devices. Graphics rendering intermediary 122 may be adapted receive models via either or both of model copier 201 and/or model extractor 211.

Real-time rendering manager 210 may be adapted to receive compositing flow 154; employ model extractor 211 to extract any models included in compositing flow 154 and store extracted models in the model store; employ model retriever 212 to retrieve, from the model store, models identified by model IDs in compositing flow 154; and employ sequencer 213 to sequence a stream of models and rendering data, the stream comprising rendering information from compositing flow 154 and models, wherein the models in the stream may be extracted from compositing flow 154 and/or retrieved from the model store. Real-time rendering manager 210 and/or sequencer 213 may be adapted to deliver the sequenced stream of models and rendering data to the GPU.

Session/delivery manager 220 may be adapted to receive session info identifying a client device and/or session ID for a session between a server computing device a client device; establish communications with the client device in the context of the identified session; receive a rendered graphics stream from the GPU; and send the rendered graphics stream to the client device.

Figure 3:
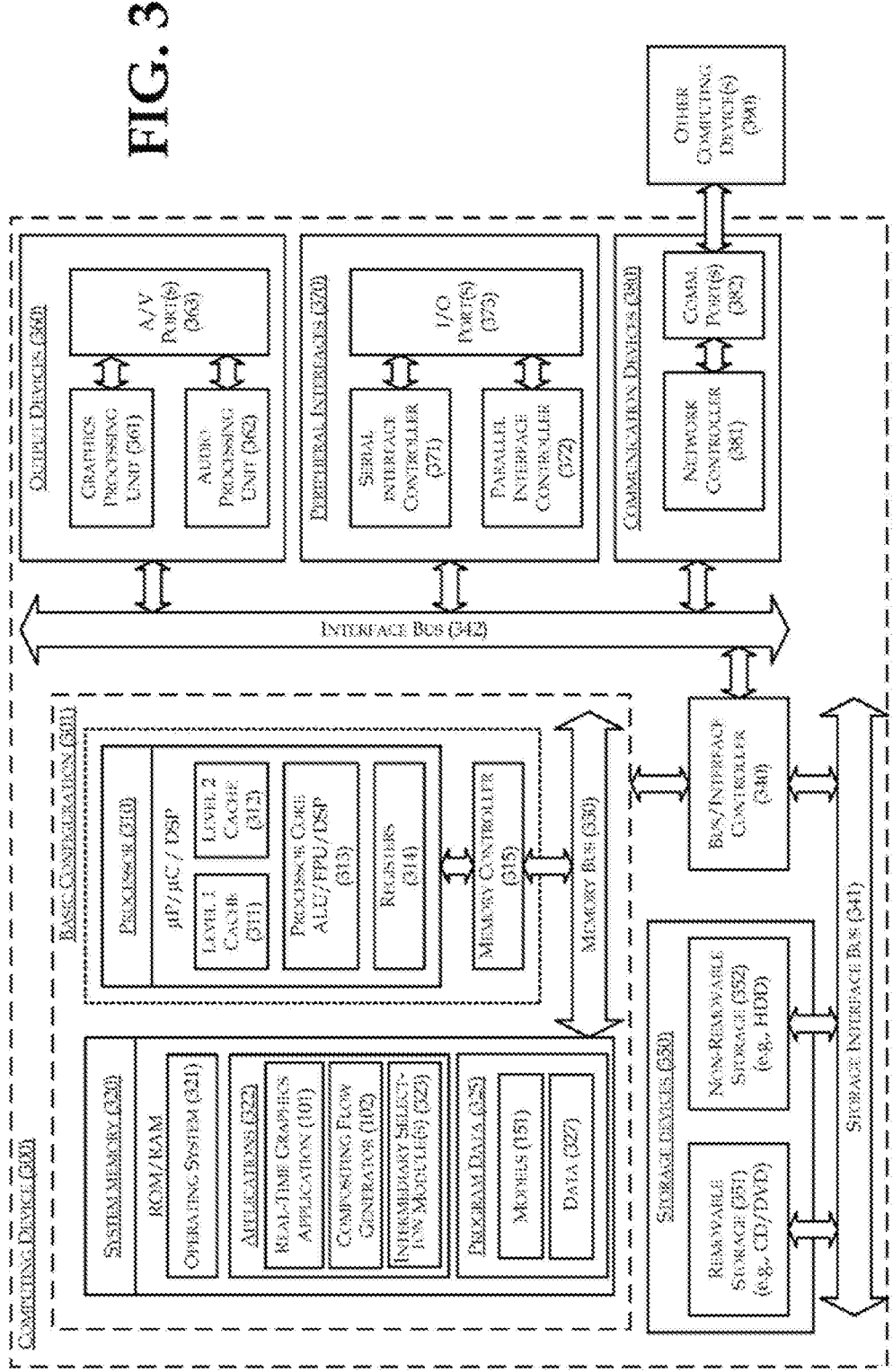
FIG. 3 is a block diagram of a computing device as one example of a server computing device providing a real-time graphics rendering application.

FIG. 3 is a block diagram of a computing device as one example of a server computing device providing a real-time graphics rendering application, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 325. In some embodiments, operating system 321 may comprise a virtual machine that is managed by a Virtual Machine Manager (VMM).

Applications 322 may include, for example, real-time graphics application 101, compositing flow generator 102, and/or intermediary selection module(s) 323. Real-time graphics application 101 and compositing flow generator 102 are introduced above in connection with FIG. 1. In some embodiments, compositing flow generator 102 may be deployed within operating system 321. Compositing flow generator 102 may for example be available as an operating system service available to multiple different real-time graphics applications. Intermediary selection module(s) 323 may be adapted to select an appropriate intermediary computing device for each client device that interacts with real-time graphics application 101. Intermediary selection module(s) 323 may generally use network locations of client devices and available intermediary computing devices to make intermediary computing device selections. For example, intermediary selection module(s) 323 may be adapted to select an intermediary computing device with a shortest network connection to a client device.

Program data 325 may include models 151 and data 327 that may be used by applications 322. Data 327 may include, e.g., lists of models that have previously been delivered to each intermediary computing device. It will be appreciated that real-time graphics applications may use any of a wide variety of application-specific program data which may be included in program data 325.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, level 2 cache 312, system memory 320, removable storage 351, and non-removable storage devices 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 300. Any such computer storage media may be part of computing device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more AN ports 363. Example peripheral interfaces 370 may include a serial interface controller 371 or a parallel interface controller 372, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a server computing device in a data center. In some embodiments, the data center may comprise an "open" data center that provides computational resources to multiple different customers, including, e.g., an owner/operator of real-time graphics application 101. In some embodiments, the data center may comprise a "closed" data center which may be used exclusively by the owner/operator of real-time graphics application 101, e.g., to run real-time graphics application 101 and optionally other real-time graphics applications also owned or controlled by the same owner/operator. In some embodiments, computing device 300 may be implemented as a server computing device at a data center hosting a multiplayer online video game enabled by real-time graphics application 101, wherein models 151 may comprise video game models, and wherein model identifiers and model rendering information in compositing flows generated by compositing flow generator 102 may be influenced by application control instructions from multiple players of the multiplayer online video game.

Figure 4:
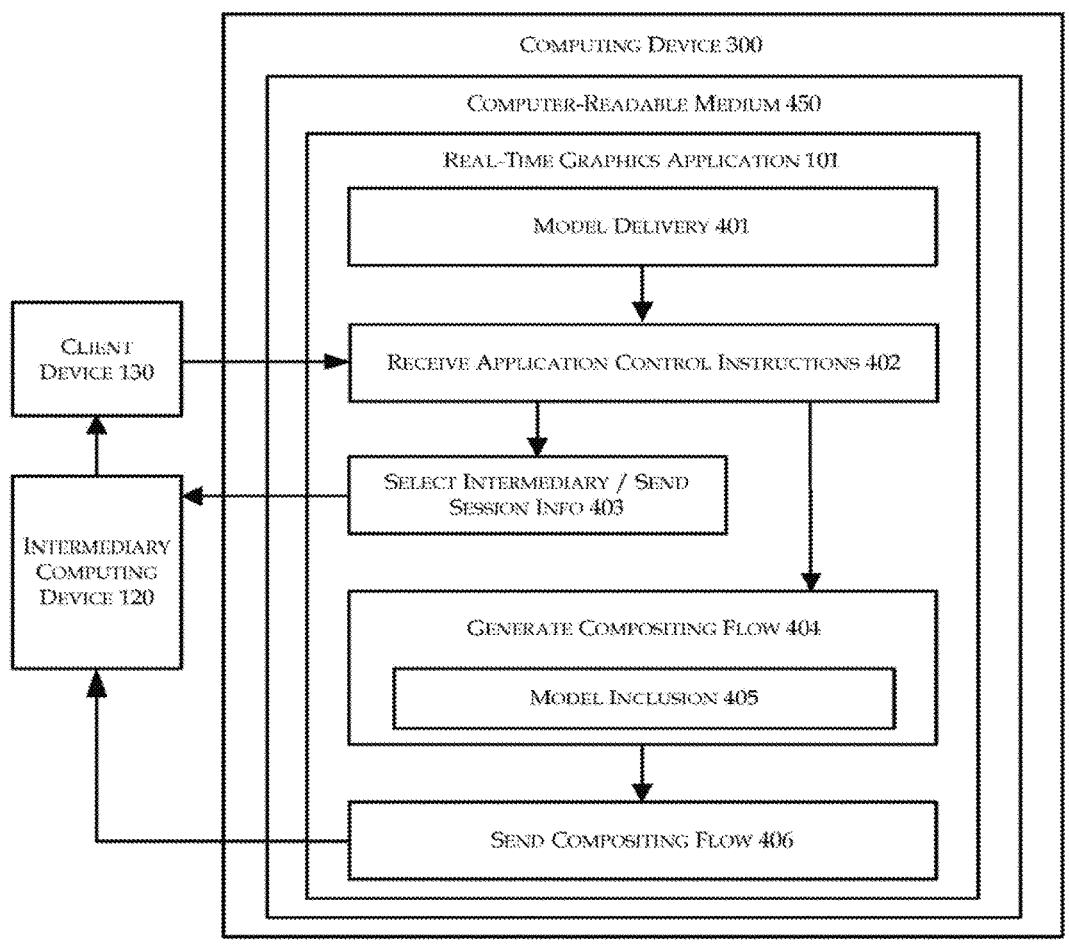
FIG. 4 is a flow diagram of example methods for providing, by a server computing device, a compositing flow to an intermediary computing device.

FIG. 4 is a flow diagram of example methods for providing, by a server computing device, a compositing flow to an intermediary computing device, arranged in accordance with at least some embodiments of the present disclosure. The example flow diagram may include one or more operations/modules as illustrated by blocks 401-406, which represent operations as may be performed in a method by real-time graphics application 101, functional modules in a computing device 300, and/or instructions as may be recorded on a computer readable medium 450. The illustrated blocks 401-406 may interact with intermediary computing device 120 and client device 130 as shown.

In FIG. 4, blocks 401-406 are illustrated as including blocks being performed sequentially, e.g., with block 401 first and block 406 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300, arranged as a server computing device such as server computing device 100 in FIG. 1, may provide, to intermediary computing device 120, a compositing flow according to application control instructions received from client device 130, wherein intermediary computing device 120 is adapted to provide rendered graphics according to the compositing flow to client device 130. In FIG. 4, a "Model Delivery" block 401 precedes a loop comprising a "Receive Application Control Instructions" block 402, a "Generate Compositing Flow" block 404 and a "Model Inclusion" block 405, and a "Send Compositing Flow" block 406. To complete the loop, block 406 sends a compositing flow to intermediary computing device 120, intermediary computing device 120 sends a rendered graphics stream to client device 130, and client device 130 sends additional application control instructions to "Receive Application Control Instructions" block 402. In a first instance of the loop comprising blocks 402, 404/405, and 406, operations pursuant to a "Select Intermediary/Send Session Information" block 403 may additionally be performed. Block 403 need not necessarily be performed in subsequent instances of the loop comprising blocks 402, 404/405, and 406.

At "Model Delivery" block 401, computing device 300 may send, via a network, one or more models to intermediary computing device 120. In embodiments wherein computing device 300 is adapted with block 401, computing device 300 may send models by any appropriate method. For example, computing device 300 may send models as a model package comprising substantially all models for use with real-time graphics application 101; computing device 300 may send an initial model package followed by model update packages; computing device 300 may send models at night or during periods of low network demand on a long network connection such as 161; and computing device 300 may optionally employ any available technologies for transferring large model files to a plurality of intermediary computing devices. In some embodiments, computing device 300 may select, at block 401, a set of models for delivery at block 401. The selected set of models may be a subset of the models used by real-time graphics application 101. Model selection may optionally account for one or more of model popularity, model size, expected time until model update, statistical probability of use of a model, previous use of a model by a particular user or user demographic, and/or any number of other considerations as may be appreciated with the benefit of this disclosure.

Block 401 may be omitted in some embodiments. For example, models may be provided to intermediary computing device 120 by a separate model server, other than server computing device 300; block 401 may be accomplished by physically mailing a DVD or other computer readable memory to operators of intermediary computing device 120; or computing device 300 and real-time graphics application 101 may rely on block 405 for model delivery. Block 401 may be followed by block 402, wherein block 402 may occur at any time subsequent to block 401, in connection with an initiated session between real-time graphics application 101 and client device 130.

At "Receive Application Control Instructions" block 402, computing device 300 may receive, via the network, application control instructions from client device 130. In embodiments wherein real-time graphics application 101 supports interactions of multiple users or players, block 402 may comprise receiving application control instructions from client device 130 as well as from multiple other devices corresponding to other users or players of the real-time graphics application 101.

Real-time graphics application 101 may generally perform any operations in connection with initiating a session with client device 130, and thereafter providing application services to client device 130. Specific application services may depend on the purpose for which real-time graphics application 101 is designed. Example embodiments described herein include but are not limited to video game services. Application control instructions for a video game application may comprise, e.g., player movement and other player action commands. Block 402 may be followed by blocks 403 and 404.

At "Select Intermediary/Send Session Information" block 403, computing device 300 may send to intermediary computing device 120, via the network, session information identifying client device 130. Computing device 300 may initially select intermediary computing device 120 from a plurality of available intermediary computing devices. For example, computing device 300 may select intermediary computing device 120 based on network locations of intermediary computing device 120 and client device 130, so that a network distance between intermediary computing device 120 and client device 130 is shorter than a network distance between server computing device 300 and client device 130. In some embodiments, computing device 300 may select an intermediary computing device from a plurality of available intermediary computing devices, wherein the selected intermediary computing device has a shortest network distance to client device 130 as compared to other available intermediary computing devices. Intermediary computing devices available for selection at block 403 may comprise, for example, one or more devices in a CDN or a MAN.

Once computing device 300 selects intermediary computing device 120, computing device 300 may send session information to intermediary computing device 120. The session information may identify, to intermediary computing device 120, client device 130 and/or session information regarding the session between computing device 300 and client device 130. In some embodiments, block 403 may be incorporated into block 404, e.g., by including client device ID and/or session ID information in the compositing flow sent to intermediary computing device 120. In some embodiments, block 403 may be performed once per session with client device 130, and block 403 need not be repeated when subsequently sending compositing flow information to intermediary computing device 120. Block 403 may be followed by block 404.

At "Generate Compositing Flow" block 404, computing device 300 may generate a compositing flow. The compositing flow may comprise at least model IDs and model rendering information as a real-time graphics application 101 output resulting from processing, by real-time graphics application 101, inputs comprising application control instructions received from client device 130. The model rendering information may comprise, e.g., model position information, model orientation information, viewpoint information, light source information, and/or any other information as appropriate for rendering models to produce, e.g., rendered video graphics. The compositing flow may not include one or more models identified by the model IDs therein. Models not included in compositing flows may comprise, e.g., models previously sent to the intermediary computing device, e.g., at block 401 or 405.

Compositing flows may be generated using any hardware or software approach. For example, in some embodiments, compositing flow generator 102 may intercept a GPU instruction stream comprising GPU instructions and data, e.g., as may be generated for the purpose of local graphics rendering by a GPU at computing device 300. Compositing flow generator 102 may modify the intercepted GPU instruction stream as appropriate to include model IDs and rendering information recognizable by intermediary computing devices, thereby generating the compositing flow. In some embodiments, real-time graphics application 101 may render graphics with a GPU at computing device 300, and compositing flow generator 102 may use the locally rendered graphics, optionally in combination with GPU instruction stream information, to ascertain model IDs and rendering information to include in the compositing flow. In some embodiments, compositing flow generator 102 may comprise a modified GPU, which may be adapted to output a compositing flow comprising model IDs and rendering information instead of rendered graphics. In some embodiments, block 404 may include block 405.

At "Model Inclusion" block 405, computing device 300 may determine which models identified by model IDs in the compositing flow were previously sent to intermediary computing device 120, and computing device 300 may include, in the compositing flow, models not previously sent to intermediary computing device 120, while not including, in the compositing flow, some or all models previously sent to intermediary computing device 120. In embodiments wherein some or all models are not sent to intermediary computing device 120 at block 401, computing device 300 may include models in compositing flows.

In an example scenario, a compositing flow may initially reference model IDs for models A, B, and C, none of which have been previously sent to intermediary computing device 120. Block 405 may determine that models A, B, and C were not previously sent to intermediary computing device 120, and computing device 300 may include, in the initial compositing flow, models A, B, and C. The compositing flow may subsequently reference model IDs for models B, C, D, and E, wherein models B and C were previously sent to intermediary computing device 120, but models D and E have not been previously sent to intermediary computing device 120. Block 405 may determine that models B and C were previously sent to intermediary computing device 120 (in this case, models B and C were previously sent in the initial compositing flow) and that models D and E have not been previously sent to intermediary computing device 120. Computing device 300 may for example maintain and check a list of models previously sent to intermediary computing device 120. Computing device 300 may include, in the subsequent compositing flow, models D and E, while not including, in the subsequent compositing flow, models B and C. Block 405 may be followed by block 406.

At "Send Compositing Flow" block 406, computing device 300 may send, via the network, the compositing flow to intermediary computing device 120. Block 406 may be followed by graphics rendering at intermediary computing device 120 and delivery of rendered graphics from intermediary computing device 120 to client device 130. Client device 130 may send new application control instructions to computing device 300, which new application control instructions may be received at block 402. The loop comprising blocks 402, 404/405, and 406 may continue for the duration of the session between client device 130 and computing device 300/real-time graphics application 101.

Figure 5:
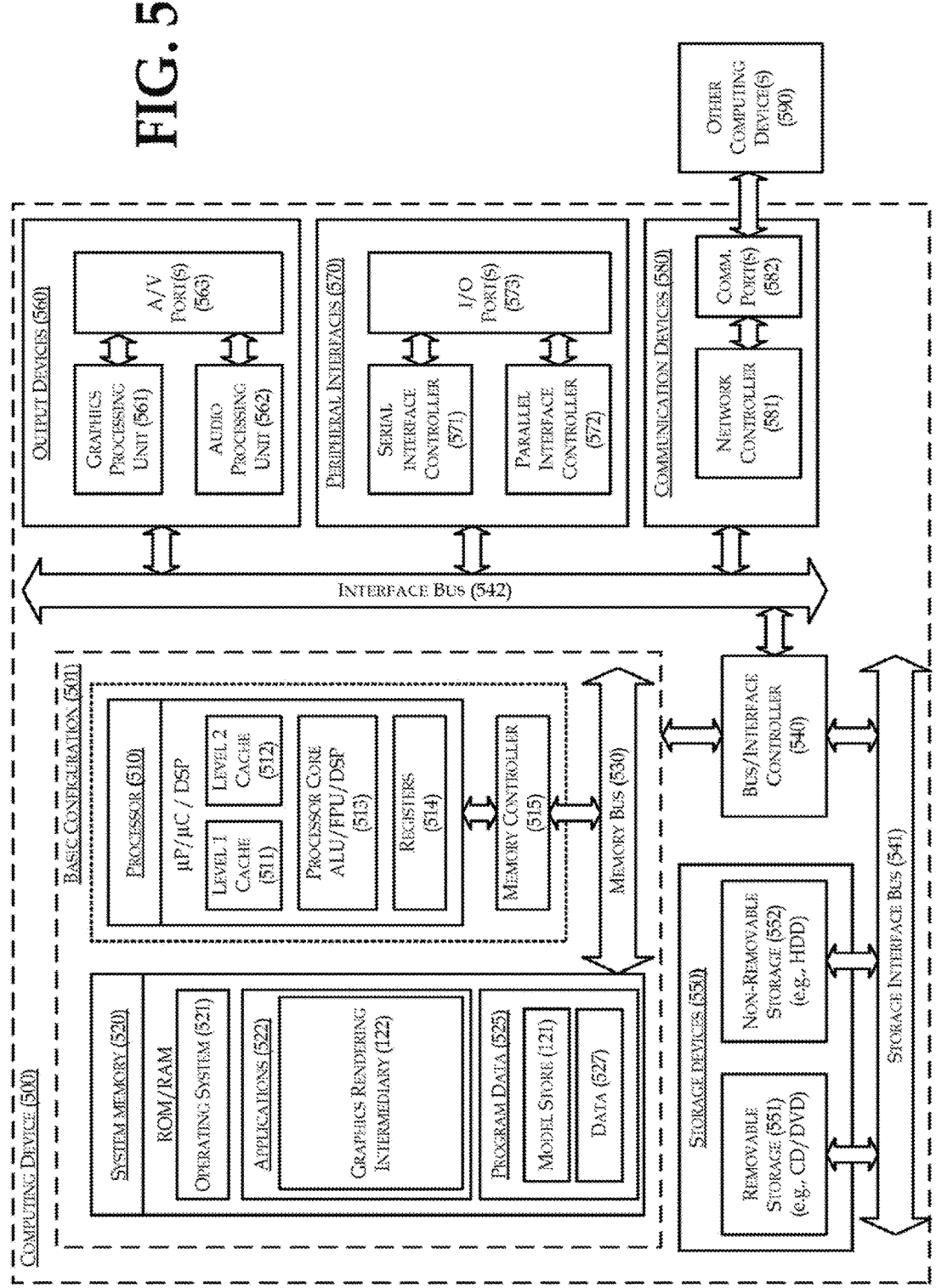
FIG. 5 is a block diagram of a computing device as one example of an intermediary computing device adapted to provide rendered graphics.

FIG. 5 is a block diagram of a computing device as one example of an intermediary computing device adapted to provide rendered graphics, arranged in accordance with at least some embodiments of the present disclosure. Computing device 500 may generally be arranged with similar device components, connections, and properties as described in connection with computing device 300 in FIG. 3. Computing device 500 may differ from computing device 300 at least in part by being configured with different applications, such as applications 522, and different data, such as data 527. Computing device 500 may also have different hardware from computing device 300 as needed to support the various operations of an intermediary computing device, which hardware may be selected as appropriate to support embodiments of this disclosure.

In a very basic configuration 501, computing device 500 may include one or more processors 510 and system memory 520. A memory bus 530 may be used for communicating between the processor 510 and the system memory 520. Processor 510 may include one or more levels of caching, such as a level one cache 511 and a level two cache 512, a processor core 513, and registers 514. A memory controller 515 may also be used with the processor 510, or in some implementations the memory controller 515 may be an internal part of the processor 510.

System memory 520 may include an operating system 521, one or more applications 522, and program data 525. In some embodiments, operating system 521 may comprise a virtual machine that is managed by a Virtual Machine Manager (VMM). Applications 522 may include, for example, graphics rendering intermediary 122. Program data 525 may include model store 121 and other data 527, such as session information and compositing flow information comprising model IDs and rendering information that may be used by graphics rendering intermediary 122.

Computing device 500 may also include a bus/interface controller 540 to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and HDDs, optical disk drives such as CD drives or DVD drives, SSDs, and tape drives.

Computing device 500 may also include an interface bus 542 for facilitating communication from various interface devices to the basic configuration 501 via the bus/interface controller 540. Example output devices 560 include GPU 561, which may implement GPU 123 in FIG. 1 in some embodiments, and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate through either wired or wireless connections with external devices such as input devices or other peripheral devices via one or more I/O ports 573. An example communications device 580 includes a network controller 581, which may be arranged to facilitate communications with one or more other computing devices 590, such as server computing device 100 and client device 130 as illustrated in FIG. 1, over a network communication via one or more communication ports 582.

Computing device 500 may be implemented as a server computing device in a CDN, a MAN, or any other network comprising servers which may be closer to client device than servers running real-time graphics applications, such as server computing device 100. Computing device 500 may also be implemented as server in a distributed network of intermediary computing devices which may be operated by, e.g., an operator of real-time graphics applications.

Figure 6:
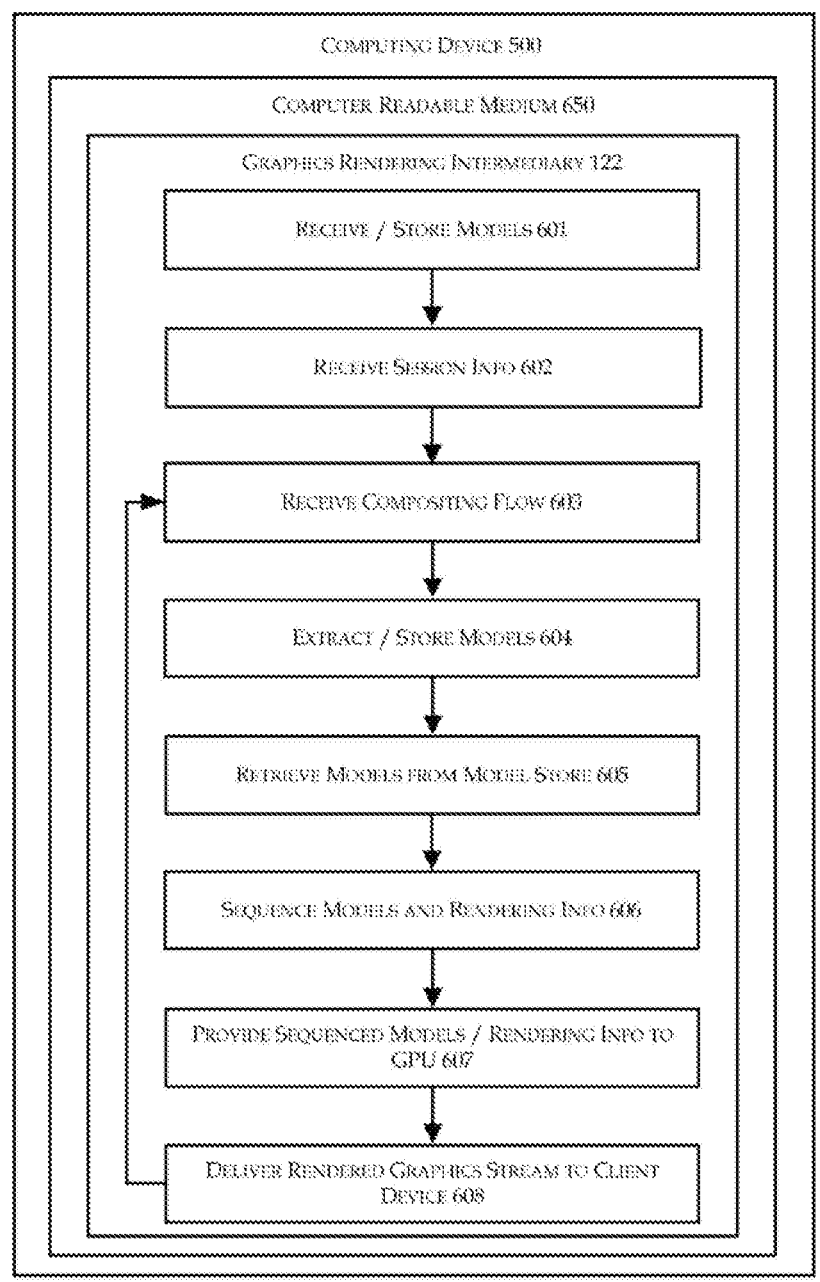
FIG. 6 is a flow diagram of example methods for rendering graphics by an intermediary computing device.

FIG. 6 is a flow diagram of example methods for rendering graphics by an intermediary computing device, arranged in accordance with at least some embodiments of the present disclosure. The example flow diagram may include one or more operations/modules as illustrated by blocks 601-608, which represent operations as may be performed in a method by graphics rendering intermediary 122, functional modules in a computing device 500, and/or instructions as may be recorded on a computer readable medium 650.

In FIG. 6, blocks 601-608 are illustrated as including blocks being performed sequentially, e.g., with block 601 first and block 608 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates example methods for rendering graphics by intermediary computing device 500. In FIG. 6, a "Receive/Store Models" block 601 precedes a session in which graphics are rendered and delivered to a client device. The session comprises a "Receive Session Info" block 602, followed by a loop comprising a "Receive Compositing Flow" block 603, an "Extract/Store Models" block 604, a "Retrieve Models From Model Store" block 605, a "Sequence Models and Rendering Info" block 606, a "Provide Sequenced Models/Rendering Info to GPU" block 607, and a "Deliver Rendered Graphics Stream to Client Device" block 608. The loop comprising blocks 603-608 need not necessarily be performed one block at a time. For example, in some embodiments blocks 603-608 may each operate substantially continuously, responsive to a substantially continuous compositing flow received at block 603. The loop comprising blocks 603-608 may operate throughout a session between the client device and a real-time graphics application—that is, for so long as the real-time graphics application delivers the compositing flow for the client device to intermediary computing device 500.

At "Receive/Store Models" block 601, computing device 500 may receive and store one or more models in a model store. Block 601 may comprise maintaining a lookup table for stored models, the lookup table comprising model IDs and pointers to memory locations in the model store where identified models are stored. Models may be received by delivery via a network or by any other approach such as by copying from a DVD or other computer readable medium. Some embodiments may omit block 601 and may rely instead on block 604 to receive and store models. Some embodiments may use combinations of blocks 601 and 604 to receive and store models. Block 601 may be followed by block 602.

At "Receive Session Info" block 602, computing device 500 may receive, via a network, session information from a server computing device, the session information identifying a client device. Session information may optionally identify multiple client devices, in which case graphics rendered from a compositing flow may optionally be delivered to the multiple client devices. In some embodiments, computing device 500 may store the received session information for use in delivery of a rendered graphics stream to the identified client device. Block 602 may be followed by block 603.

At "Receive Compositing Flow" block 603, computing device 500 may receive, via the network, a compositing flow provided by the server computing device. The compositing flow may comprise at least model IDs and model rendering information. In some embodiments, the compositing flow may comprise a substantially continuous stream of model IDs and model rendering information. The model IDs may identify models previously stored by computing device 500 in the model store. The model rendering information may comprise model position information, model orientation information, viewpoint information, light source information, and/or any other model rendering information. In some embodiments, the compositing flow may occasionally comprise one or more models not in the model store, which models may be extracted and stored in the model store at block 604. Block 603 may be followed by block 604.

At "Extract/Store Models" block 604, computing device 500 may extract models from the compositing flow received at block 603. For example, when a full model is included in the received composting flow, in addition to the model IDs and rendering information normally included in the composting flow, block 604 may extract the full model for storage and later use in connection with subsequent portions of the compositing flow and/or subsequent graphics rendering for the real-time graphics application. Block 604 may store extracted models in the model store. In some embodiments, block 604 may optionally also provide extracted models directly to block 605 for immediate use in graphics rendering. Block 604 may be followed by block 605.

At "Retrieve Models from Model Store" block 605, computing device 500 may retrieve models identified in the received compositing flow from the model store. Computing device 500 may for example read the received compositing flow information to identify model IDs therein. Computing device 500 may lookup model IDs referenced in the received compositing flow in a lookup table to determine memory locations for identified models in the model store. Computing device 500 may copy the identified models from their memory locations in the model store to another memory location, e.g., to a CPU cache, a graphics card memory, a GPU cache, a SSD storage device, disk storage, or other memory from which the identified models may be sent to a GPU for rendering. Block 605 may be followed by block 606.

At "Sequence Models and Rendering Info" block 606, computing device 500 may sequence the identified models retrieved at block 605 with rendering information from the compositing flow. The rendering information in the received compositing flow may include rendering information for one or more different models, and the rendering information may include sequencing information specifying rendering operations to be carried out in sequential video frames. Block 606 may sequence the models by sending models to the GPU in an appropriate order and at appropriate times when the models are needed at the GPU, as well as by sending rendering information to the GPU in an appropriate order so that sequential video frames are rendered according to the sequence specified in the compositing flow. Block 606 may be followed by block 607.

At "Provide Sequenced Models/Rendering Info to GPU" block 607, computing device 500 may provide the identified models from the model store and model rendering information from the received compositing flow, as sequenced at block 606, to a GPU for rendering, thereby causing the GPU to render graphics according to the received compositing flow.

The GPU may be a local GPU, e.g., in a same device housing as other components of computing device 500, or the GPU may be otherwise operably coupled with computing device 500. For example, in some embodiments multiple computing devices may share a same high performance graphics card comprising the GPU. Furthermore, in some embodiments multiple instances of graphics rendering intermediary 122, at computing device 500 and/or other computing devices in a same LAN as computing device 500, may share GPU resources. For example, methods such as illustrated in FIG. 6 may be performed multiple times in substantially simultaneous fashion, using a same GPU or one or more shared GPUs, to simultaneously provide rendered graphics to multiple clients according to multiple different compositing flows.

In some embodiments, block 607 may comprise rendering, by the GPU, graphics for delivery via the network to the client device at block 608. The rendered graphics may comprise the identified models from the model store rendered according to model rendering information in the compositing flow. For example, the identified models may be positioned according to model position information, oriented according to model orientation information, viewed according to viewpoint information, lighted according to light source information, and/or otherwise rendered according to model rendering information in the compositing flow. Block 607 may be followed by block 608.

At "Deliver Rendered Graphics Stream to Client Device" block 608, computing device 500 may deliver, via a network, a rendered graphics stream output produced by the GPU to the client device. The rendered graphics stream output may comprise the identified models from the model store positioned and/or otherwise rendered according to the model position information in the compositing flow, as generated pursuant to block 607. In some embodiments, computing device 500 may deliver, along with the rendered graphics stream, audio, tactile or other output information for playback at the client device along with the rendered graphics stream. For example, computing device 500 may merge audio or tactile information received along with a compositing flow into rendered graphics stream data for delivery to the client device. In some embodiments, another device coupled in a LAN with computing device 500 may include block 608—for example, rendered graphics streams may be forwarded from a GPU to a dedicated stream server responsible for streaming graphics to client devices. In some embodiments, block 608 may be followed by return to block 603 for continuous operation of the loop comprising blocks 603-608. In some embodiments, block 608 as well as blocks 603-607 may operate substantially continuously to deliver a substantially continuous rendered graphics stream output from the GPU to the client device.

Figure 7:
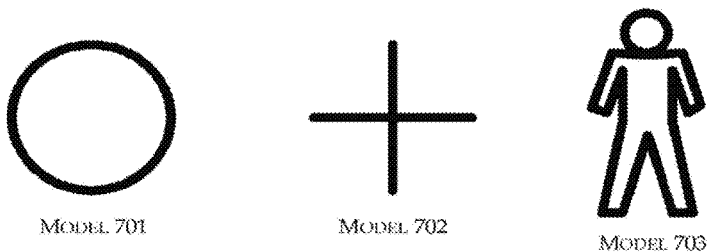
FIG. 7 is a diagram illustrating example models, an example compositing flow, and an example rendered graphics stream, all arranged in accordance with at least some embodiments of the present disclosure.
Figure 7:
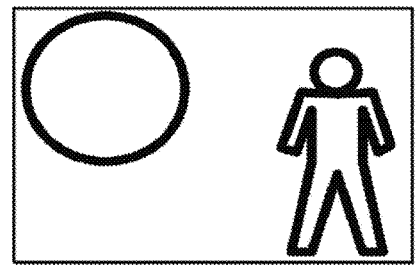
Figure 7:
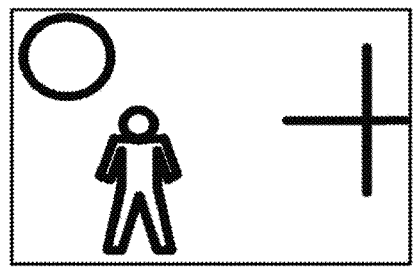

FIG. 7 is a diagram illustrating example models, an example compositing flow, and an example rendered graphics stream, arranged in accordance with at least some embodiments of the present disclosure. FIG. 7 includes a model 701, a model 702, and a model 703, a compositing flow 710, and a rendered graphics stream 720, comprising a frame 1 and a frame 2.

Models 701, 702, and 703 may be delivered to an intermediary computing device and stored in a model store, as described herein. Compositing flow 710 may be received at the intermediary computing device and used along with models 701, 702, and 703 to generate rendered graphics stream 720 for delivery to a client device. Compositing flow 710 includes a sequence of frames comprising frame 1 and frame 2, and simplified rendering information for each frame. For example, rendering information for frame 1 includes model IDs for models 701 and 703. A position X1, Y1 and an orientation O1 is specified for model 701, and a position X2, Y2 and an orientation O2 is specified for model 703. Rendering information for frame 2 includes model IDs for models 701, 702, and 703. A position X3, Y3 and an orientation O3 is specified for model 701, a position X4, Y4 and an orientation O4 is specified for model 703, and a position X5, Y5 and an orientation O5 is specified for model 702. Compositing flow 710 may comprise further rendering information, e.g., a substantially continuous stream of rendering information including a stream of different rendering instructions for models 701, 702, and 703.

Rendered graphics stream 720 may be generated at the intermediary computing device, and delivered to the client device, as described herein. Rendered graphics stream 720 may comprise rendered frames, such as rendered frame 1 and rendered frame 2, which are rendered using models 701, 702, and 703 and rendering information in compositing flow 710. Rendered graphics stream 720 may comprise further rendered frames rendered according to further rendering information as may be included in composting flow 710. For example, rendered frame 1 includes model 701 in an example position X1, Y1 and an orientation O1, and model 703 in an example position X2, Y2 and an orientation. Rendered frame 2 includes model 701 in an example position X3, Y3 and an orientation O3, model 703 in an example position X4, Y4 and an orientation O4, and model 702 in an example position X5, Y5 and an orientation O5.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method to render graphics by a content delivery network (CDN) server, wherein the CDN server is configured to be coupled via a long network connection to a server computing device, and wherein the CDN server is configured to be coupled via a short network connection to a client device, wherein the long network connection has longer network packet travel times or higher transmission costs than the short network connection, the method comprising:
    storing, by the CDN server, a plurality models in a model store;
    retrieving, by the CDN server, one or more models of the plurality of models from the model store, wherein retrieving the one or more models is based on model identifiers that are received from the server computing device via the long network connection; and
    providing, by the CDN server, via the short network connection, graphics to the client device for rendering, wherein providing the graphics comprises providing at least the retrieved one or more models from the model store.

2. The method of claim 1, further comprising receiving, via the long network connection by the CDN server, the plurality of models that are stored in the model store.

3. The method of claim 1, further comprising receiving, via the long network connection, model rendering information, wherein the model rendering information comprises one or more of: model orientation information, viewpoint information, or light source information, and wherein the provided graphics comprise the retrieved one or more models which are: oriented according to the model orientation information, viewed from according to the viewpoint information, or lighted according to the light source information.

4. The method of claim 1, further comprising performing the method multiple times, to simultaneously provide graphics to multiple client devices according to multiple different model identifiers.

5. The method of claim 1, wherein the server computing device comprises a server at a data center that hosts a multiplayer online video game, wherein the plurality of models comprise video game models, and wherein the model identifiers are influenced by actions of multiple players of the multiplayer online video game.

6. A non-transitory computer readable storage medium having computer executable instructions that are executable by a processor at a content delivery network (CDN) server, wherein the CDN server is configured to be coupled via a long network connection to a server computing device, wherein the CDN server is configured to be coupled via a short network connection to a client device, wherein the long network connection has longer network packet travel times or higher transmission costs than the short network connection, and wherein the instructions, in response to execution by the processor, implement a graphics rendering intermediary which causes the processor to perform or control performance of operations that comprise:
    store a plurality of models in a model store;
    retrieve one or more models of the plurality of models from the model store, wherein the retrieval of the one or more models is based on model identifiers that are obtained from the server computing device via the long network connection; and
    provide, via the short network connection, graphics to the client device for rendering, wherein the provided graphics comprise at least the retrieved one or more models from the model store.

7. The non-transitory computer readable storage medium of claim 6, wherein the operations to store the plurality of models in the model store are performed in response to receipt of the plurality of models from the server computing device.

8. The non-transitory computer readable storage medium of claim 6, wherein the operations further comprise:
    obtain model rending information, wherein the model rendering information comprises one or more of: model orientation information, viewpoint information, or light source information, and wherein the provided graphics comprise the retrieved one or more models which are: oriented according to the model orientation information, viewed from according to the viewpoint information, or lighted according to the light source information.

9. The non-transitory computer readable storage medium of claim 6, wherein the operations further comprise:
    simultaneously provide graphics to multiple client devices according to multiple different model identifiers, for graphics rendering for the multiple client devices.

10. The non-transitory computer readable storage medium of claim 6, wherein the server computing device comprises a server at a data center that hosts a multiplayer online video game, wherein the plurality of models comprise video game models, and wherein the model identifiers are influenced by actions of multiple players of the multiplayer online video game.

11. A content delivery network (CDN) server adapted to provide rendered graphics, wherein the CDN server is configured to be coupled via a long network connection to a server computing device, wherein the CDN server is configured to be coupled via a short network connection to a client device, and wherein the long network connection has longer network packet travel times or higher transmission costs than the short network connection, the CDN server comprising:
    a processor;
    a memory coupled to the processor; and
    a graphics rendering intermediary stored in the memory and executable by the processor, wherein the graphics rendering intermediary is configured to:
    store a plurality of models in a model store;
    retrieve one or more models of the plurality of models from the model store, wherein the retrieval of the one or more models is based on model identifiers that are received from the server computing device via the long network connection; and provide, via the short network connection, graphics to the client device for rendering, wherein the provided graphics comprises at least the retrieved one or more models from the model store.

12. The CDN server of claim 11, wherein the graphics rendering intermediary is configured to store the one or more models in the model store in response to receipt of the one or more models from the server computing device.

13. The CDN server of claim 11, wherein the graphics rendering intermediary is configured to receive, via the long network connection, model rendering information, wherein the model rendering information comprises one or more of: model orientation information, viewpoint information, or light source information, and wherein the provided graphics comprise the retrieved one or more models which are: oriented according to the model orientation information, viewed from according to the viewpoint information, or lighted according to the light source information.

14. The CDN server of claim 11, wherein the graphics rendering intermediary is configured to simultaneously provide graphics to multiple client devices according to multiple different model identifiers, so as to render graphics for the multiple client devices.

15. The CDN server of claim 11, wherein the server computing device comprises a server at a data center that hosts a multiplayer online video game, wherein the plurality of models comprise video game models, and wherein the model identifiers are influenced by actions of multiple players of the multiplayer online video game.

16. A system to provide rendered graphics to a client device, the system comprising:

a content delivery network (CDN server; and a server computing device configured to provide model identifiers to the CDN server, wherein the CDN server is configured to provide rendered graphics according to the model identifiers, the server computing device comprising:

a first processor;

a first memory coupled to the first processor; and a real-time graphics application stored in the first memory and executable by the first processor, wherein the real-time graphics application is configured to:

send, via a network, a plurality of models to the CDN server;

receive, via the network, application control instructions from a client device; and send, via the network, model identifiers to the CDN server, wherein the model identifiers are sent as a real-time graphics application output that results from processing, by the real-time graphics application, an input comprising the application control instructions, wherein the CDN server is adapted to provide rendered graphics to the client device, the CDN server comprising:

a second processor;

a second memory coupled to the second processor; and a graphics rendering intermediary stored in the second memory and executable by the second processor, wherein the graphics rendering intermediary is configured to:

receive, via the network, the plurality of models from the server computing device;

store the plurality of models in a model store;

retrieve one or more models of the plurality of models from the model store, wherein the retrieval of the one or more models is based on the model identifiers that are received from the server computing device; and provide, via another network, graphics to the client device for rendering, wherein the provided graphics comprise at least the retrieved one or more models from the model store.

17. The system of claim 16, wherein the real-time graphics application is configured to send the plurality of models based on at least one of:

transmission, by the real-time graphics application via the network to the CDN server, of the plurality of models before a session in which the application control instructions are received from the client device; and inclusion, by the real-time graphics application, of the plurality of models in a compositing flow by:

determination, by the real-time graphics application, of models that were previously sent to the CDN server; and inclusion, by the real-time graphics application in the compositing flow, of models identified by the model identifiers and not previously sent to the CDN server, with exclusion of models previously sent to the CDN server in the compositing flow.

18. The system of claim 16, wherein the server computing device comprises a server at a data center that hosts the real-time graphics application, wherein the real-time graphics application comprises a multiplayer online video game, wherein the models comprise video game models, and wherein the model identifiers are influenced by the application control instructions from the client device as well as application control instructions from multiple players of the multiplayer online video game.

* * * * *